(12) United States Patent
Qahouq et al.

(10) Patent No.: US 7,869,228 B2
(45) Date of Patent: Jan. 11, 2011

(54) POWER DELIVERY SYSTEMS AND METHODS WITH DYNAMIC LOOK-UP TABLE

(75) Inventors: Jaber Abu Qahouq, Beaverton, OR (US); Lilly Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 11/771,059

(22) Filed: Jun. 29, 2007

(65) Prior Publication Data

US 2009/0005885 A1 Jan. 1, 2009

(51) Int. Cl.
*H02M 3/335* (2006.01)
*G05B 19/18* (2006.01)
*G05F 1/00* (2006.01)

(52) U.S. Cl. .................. 363/21.01; 700/22; 323/282

(58) Field of Classification Search .............. 700/22; 363/21.01; 323/282, 283
See application file for complete search history.

(56) References Cited

U.S. PATENT DOCUMENTS

| | | | | |
|---|---|---|---|---|
| 5,049,796 A * | 9/1991 | Seraji | ...................... | 318/568.1 |
| 6,351,529 B1 * | 2/2002 | Holeva | ........................ | 379/395 |
| 6,466,829 B1 * | 10/2002 | Sickler | ........................ | 700/25 |
| 7,023,192 B2 * | 4/2006 | Sutardja et al. | ............. | 323/283 |
| 7,053,594 B2 * | 5/2006 | Sutardja et al. | ............. | 323/283 |
| 7,609,047 B2 * | 10/2009 | Ravichandran | ............. | 323/351 |
| 2003/0085621 A1 * | 5/2003 | Potega | ........................ | 307/18 |
| 2004/0178785 A1 * | 9/2004 | Sutardja et al. | ............. | 323/283 |
| 2004/0196016 A1 * | 10/2004 | Sutardja et al. | ............. | 323/283 |
| 2005/0046396 A1 * | 3/2005 | Patterson | ...................... | 322/28 |
| 2005/0151571 A1 * | 7/2005 | Brown et al. | ................. | 327/172 |
| 2006/0022657 A1 * | 2/2006 | Sutardja et al. | ............. | 323/283 |
| 2007/0103122 A1 * | 5/2007 | Morong et al. | ............. | 323/205 |
| 2007/0145962 A1 * | 6/2007 | Huang et al. | ................. | 323/283 |
| 2007/0225951 A1 * | 9/2007 | Eryilmaz et al. | ................. | 703/2 |
| 2008/0030182 A1 * | 2/2008 | Sutardja et al. | ............. | 323/283 |
| 2008/0059814 A1 * | 3/2008 | Esliger | ...................... | 713/300 |
| 2008/0130322 A1 * | 6/2008 | Artusi et al. | ............. | 363/21.01 |
| 2008/0157743 A1 * | 7/2008 | Martin et al. | ................. | 323/284 |
| 2008/0169796 A1 * | 7/2008 | Buethker et al. | ............. | 323/282 |
| 2008/0195878 A1 * | 8/2008 | Meijer et al. | ................. | 713/322 |
| 2008/0232141 A1 * | 9/2008 | Artusi et al. | ............. | 363/21.01 |
| 2008/0238380 A1 * | 10/2008 | Jain | ........................... | 323/269 |
| 2008/0243899 A1 * | 10/2008 | Staudinger et al. | .......... | 707/102 |
| 2008/0252280 A1 * | 10/2008 | Prodic et al. | ................. | 323/283 |
| 2008/0307240 A1 * | 12/2008 | Dahan et al. | ................. | 713/320 |

* cited by examiner

*Primary Examiner*—Albert DeCady
*Assistant Examiner*—Darrin Dunn
(74) *Attorney, Agent, or Firm*—Buckley, Maschoff & Talwalkar LLC

(57) ABSTRACT

According to some embodiments, information about a power delivery stage is determined for a plurality of operating condition values. The determined information may then be stored in a dynamic look-up table of an adaptive tracking controller engine according to some embodiments. Other embodiments are described.

19 Claims, 3 Drawing Sheets

POWER DELIVERY SYSTEMS AND METHODS WITH DYNAMIC LOOK-UP TABLE

BACKGROUND

A power delivery system, such as one associated with a Voltage Regulator (VR) for an electronics device, may receive power from a power source and provide power to a load. In some cases, a controller may sense information associated with an input to and/or an output from the voltage regulator and use that information to dynamically and/or adaptively control the voltage regulator (e.g., to improve power loss and/or dynamic performance characteristics associated with the power deliver system).

Such an approach, however, may significantly increase the cost and/or complexity associated with the power delivery system. This may be especially true, for example, the multiple control variables are being dynamically adapted for the power delivery system.

DETAILED DESCRIPTION

Adaptive and/or dynamic control schemes, especially when digital controllers are used, may improve the efficiency and/or performance of a power delivery system, such as a VR. Such schemes may, for example, provide an ability to dynamically adjust control and power stage implementations while tracking efficiency and dynamic performance characteristics of the power delivery system.

The continuous dynamic tracking of a variable for a substantially optimum point may impact stability, consume controller power, and/or prolong convergence time associated with the power deliver system. Moreover, when multiple variables are to be optimized in a single controller/VR, the interaction between the variables may increase these problems.

According to some embodiments, a dynamic look-up table may be provided for an adaptive controller for a VR. For example, each variable (such as current sharing ratio, switching frequency, dead time, drive voltage, and/or number of switches) may have a substantially optimum value under various condition sets (e.g., including load, input voltage, battery charge status, duty cycle or control variable, and/or temperature) and the appropriate information can be stored and/or determined based on the dynamic tracking results. Subsequently, these values can be used without needing to wait for an associated adaptive loop to converge. Moreover, since the look-up table may be periodically updated, the stored values may be used as initial conditions for an adaptive loop—thus allowing for faster convergence.

In addition, variables might be tracked and optimized one-at-a-time, which may result in a multi-variable optimization that can be performed a simplified and relatively stable manner. Note that only a certain number of dynamically updatable conditions might be stored in the look-up table, and that interpolation methods might be used to get higher-resolution conditions set points if appropriate. As a result, the total memory size required for embodiments may be managed within an acceptable range. Such tradeoffs might be determined, for example, based on performance resolution requirements.

Figure 1:
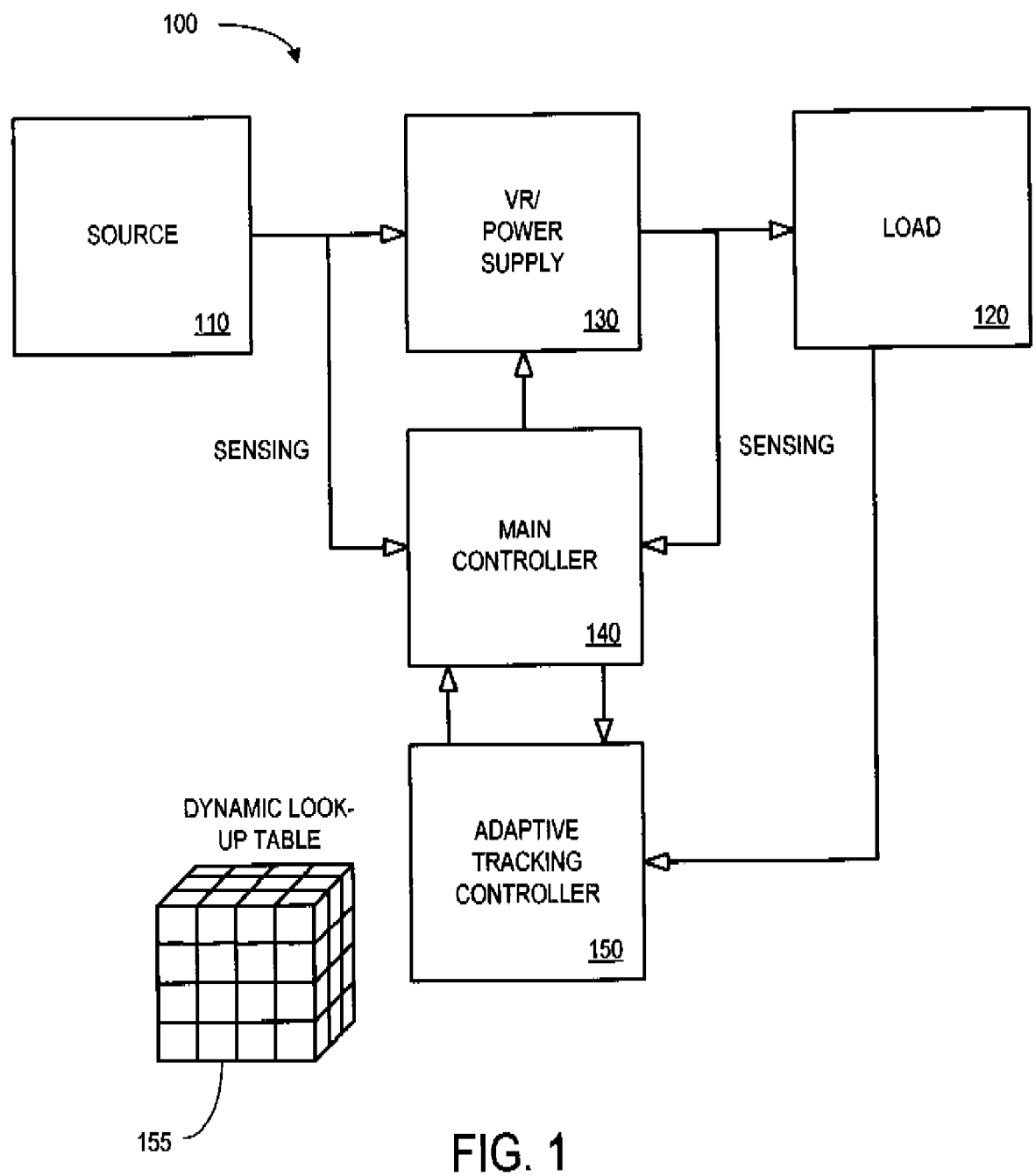
FIG. 1 is a block diagram of an apparatus according to some embodiments.

FIG. 1 illustrates an apparatus 100 according to some embodiments. Note that the apparatus 100 illustrates certain simplified tracking concepts by way of example only. For example, the apparatus 100 includes a source 110 (e.g., of DC power) that supplies power to a load 120 via a single VR/power supply 130. According to some embodiments, a main controller 140 and/or adaptive tracking controller 150 may help to substantially optimize a single variable (or multi-variables) for the apparatus 100. The main controller 140 may sense, for example, an input to the power supply 130 from the source 110 and/or an output from the power supply 130 to the load 120. According to some embodiments, the main controller 140 exchanges information with the adaptive tracking controller 150. For example, a tracking loop associated with the adaptive tracking controller 150 might be periodically adjusted to reduce power loss and/or improve the dynamic performance of the apparatus 100.

The apparatus 100 might be associated with, for example, an electronics device such as a processor for a Personal Computer (PC), a server, a mobile computer, a Personal Digital Assistant (PDA), a wireless telephone, and/or a media device (e.g., a set-top box).

According to some embodiments, information about a power delivery stage for a plurality of operating condition values may be determined. Moreover, the determined information may be stored in a dynamic look-up table 155 of the adaptive tracking controller 150. Information from the dynamic look-up table 155 may then be accessed to dynamically program the apparatus 100. For example, the determined information might be associated with a control parameter over a plurality of operating condition values, and the dynamic look-up table 155 can store information about the apparatus for the plurality of operating condition values. The operating condition values might represent, for example, a load consumption value, an input voltage value, a temperature value, a battery charge status, and/or a duty cycle value. According to some embodiments, the storing in the dynamic look-up table 155 is performed in connection with a number of different types of operating conditions.

Note that the programming associated with the VR/power supply 130 might be associated with an adaptive control scheme that at least one control parameter. By way of example, the control parameter might represent a switching frequency, a current sharing ratio, a dead-time period, a drive voltage, and/or a number of switches associated with power control. According to some embodiments, the programming is associated with a plurality of control parameters and the dynamic look-up table 155 has a multi-dimensional architecture.

Figure 2:
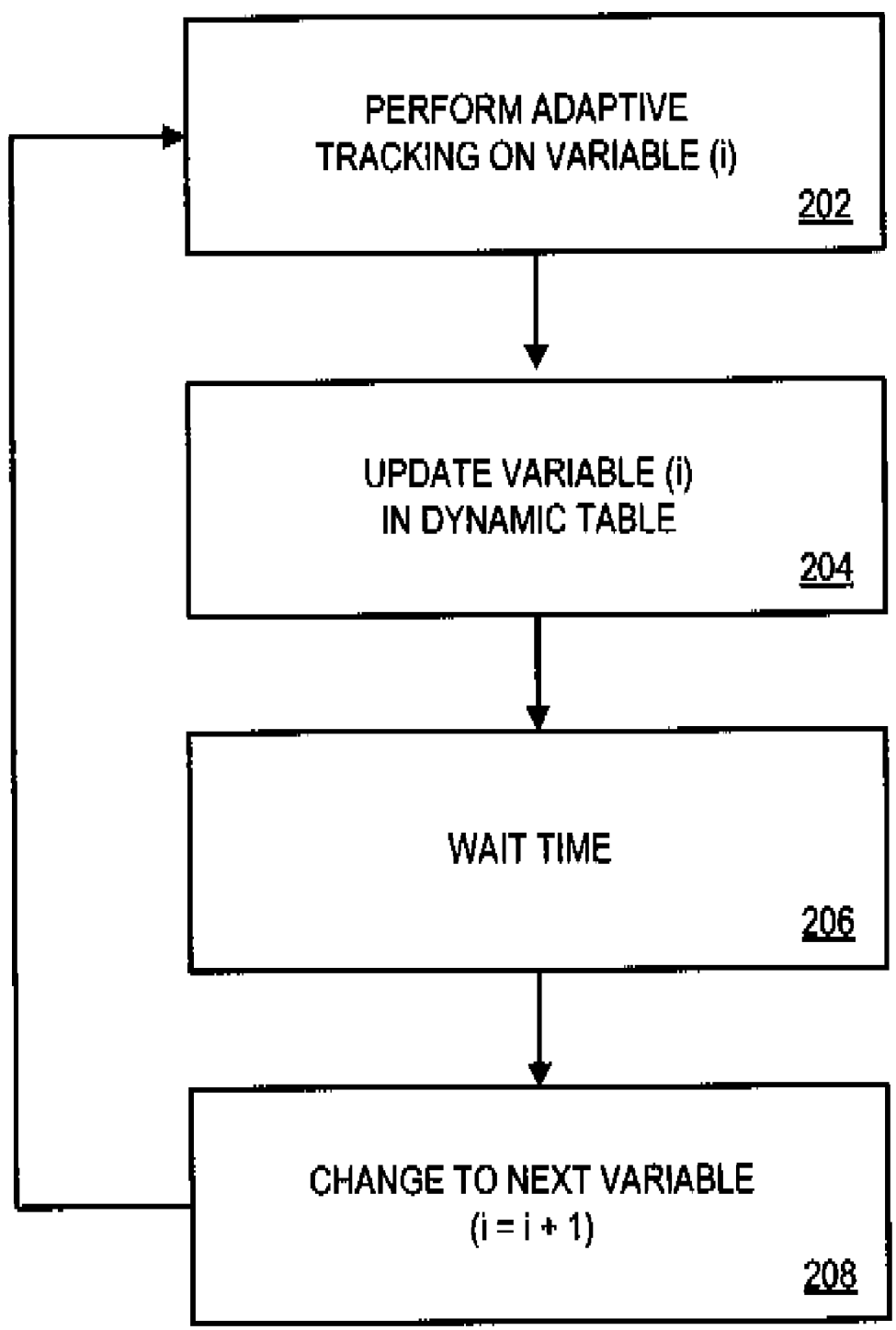
FIG. 2 is a flow diagram illustrating a method according to some embodiments.

FIG. 2 is a flow diagram illustrating a method according to some embodiments. The method may be performed, for example, in connection with the apparatus 100 of FIG. 1. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, adaptive tracking may be performed for a variable "i." At 204, the variable "i" may be updated in a dynamic table. For example, the adaptive tracking controller 150 of FIG. 1 might update the variable "i" in the dynamic look-up table 155. After a wait time at 206, the adaptive tracking controller 155 may change to the next variable (e.g., i+1) at 208, and the process may continue. In this way, the dynamic look-up table 155 may be populated with the appropriate information for the apparatus 100.

Such an approach may improve efficiency, performance, size, cost, and/or convergence speed of power conversion for the apparatus 100. That is, the use of a dynamic look-up table 155 (including, for example, a structure with a multi-dimensional architecture) and adaptive control schemes to realize single (or multi-) variables for adaptive and dynamic power delivery control schemes may improve the efficiency, performance, size, cost, and convergence speed of the apparatus.

Note that, in accordance with various embodiments of the present invention, different types of adaptive and dynamic control schemes may be used improve the efficiency and/or performance of VRs and/or any power delivery power stage. For example, the control schemes may provide on-the-fly tracking of control parameters of a power converter (e.g., optimum switching frequency, current sharing ratio, or dead time). This might be done for a single parameter, and the tracking or feedback loop of the converter might be continuously active and constantly "adjusted" until a substantially minimum power loss (the substantially optimal performance point) is reached and/or a substantially optimal dynamic performance is achieved. A potential disadvantage of such an approach might be, in some cases, the added integration complexity, performance penalties, and/or cost required to implement the process. Furthermore, if more than one variable is considered, the tracking and "tuning" may require more complicated control algorithms. With such "continuous" adaptive mechanisms, it might be difficult to both maintain power stage stability and optimize performance. In many cases, it may not be efficient to maintain continuous tracking (especially when many variables are to be optimized in a design), since this can consume controller power.

According to some embodiments, the dynamic look-up table 155 is provided for such an architecture with either a one-dimension or multi-dimension structure in order to improve the energy consumption and performance of a power converter or power delivery structure. It might function, for example, in such a manner that the converter adapts a single control variable at a time (e.g., by tracking the input current and/or peak efficiency) and stores the values for several different operating conditions (e.g., load consumption, input voltage, or temperature). The apparatus may then move on to adapt or dynamically track another parameter. Note that tracking the parameters does not need to be continuous or in any pre-defined sequence.

Note that the dynamic data may be recorded and, according to some embodiments, a check on the validity and accuracy of the recorded information may be performed periodically (in uniform or non-uniform manners depending on the nature of the specific variable or application environment). The VR (or any other type of power stage) controller might then be dynamically programmed to determine an optimum set of parameters from the dynamic look-up table 155 without needing to wait for multi-searching/comparing/adjusting loops to eventually converge to a new optimum value. Moreover, since the previous substantially optimum values were stored, such a "tracking" scheme might be controlled within practical boundary conditions. For example, a converter might activate each of the adaptive loops periodically to update the dynamic look-up table 155. Such an approach could start looking for a substantially optimum value from the stored points that resulted from previous tracking (as opposed to from unbounded random data). This may further reduce the conversion time of the operation, the power consumption used for processing, and/or the instability of the system.

Moreover, compared to a static look-up table, a total memory size used in accordance with some embodiments described herein might be managed within an acceptable range. The tradeoffs might, for example, be determined based on performance requirements such as resolution and/or accuracy.

Figure 3:
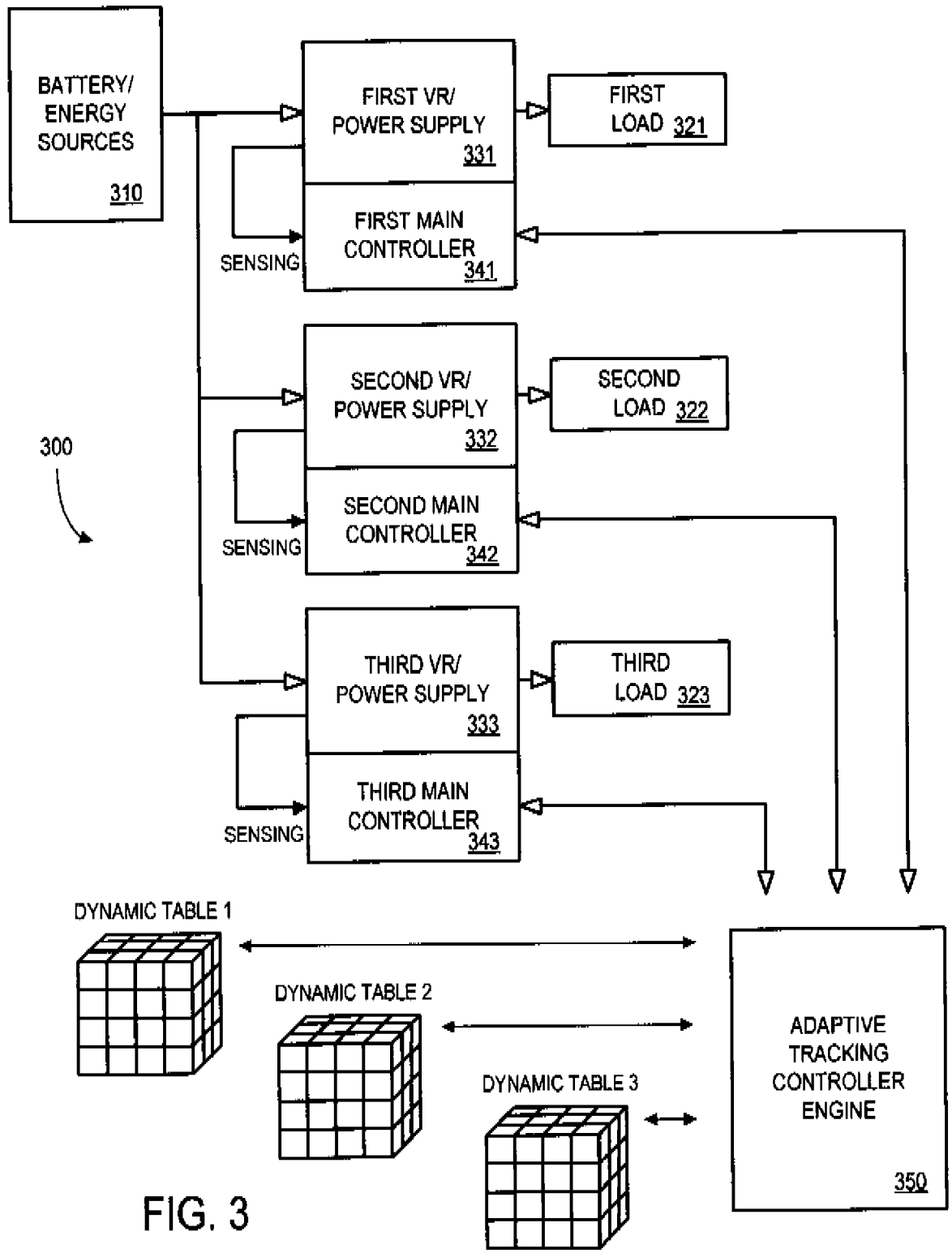
FIG. 3 is a block diagram of a system according to some embodiments.

Note that in some power distribution arrangements, such as those for a small personal computer or a laptop computer, an unregulated power signal may be supplied in parallel to a number of different voltage converters and/or regulators. Each converter/regulator may then provide a respective regulated voltage level to one or more loads (e.g., via a respective power supply rail). For example, FIG. 3 is a block diagram of a system 300 according to some embodiments. In this case, the system 300 includes energy sources 310, such as one or more batteries, that supplies power to three loads 321, 322, 323 via three VR/power supplies 331, 332, 333. Moreover, each power supply 331, 332, 333 is associated with a main controller 341, 342, 343 that sensing an input and controller the supply of power. Although three loads 321, 322, 323 are illustrated in FIG. 3, note that such an embodiment may apply to any plurality of loads.

According to this embodiment, a single adaptive tracking controller engine 350 helps to substantially optimize one or more variables for the system 300. That is, the concept described with respect to FIG. 1 can be utilized by the single adaptive controller engine 350 having a set of multi-dimensional dynamic tables and this single engine 350 can be used to optimize all VRs and power stages 331, 332, 333 in the system 300. Note that the adaptive tracking for each VR 331, 332, 333 (and variable) might be done periodically and not continuously. In this case, the adaptive engine 350 can be used alternately between all power stages 331, 332, 333, which may reduce the size, cost, and/or power of the system and centralize all information in one place (e.g., inside a power management engine).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Note that any embodiment described herein might be associated with, for example, a VR that is incorporated or otherwise integrated with a processor die and/or a System on Chip (SoC) design. Moreover, although FIG. 1 illustrates an adaptive tracking controller 150 that is separate from the main controller 140, any embodiments described herein might combine these, or similar, components into a single component.

The several embodiments described herein are solely for the purpose of illustration. Persons skilled in the art will recognize from this description other embodiments may be practiced with modifications and alterations limited only by the claims.

What is claimed is:
1. A method, comprising:
 determining information about a first power delivery stage for a plurality of operating condition values as the first power delivery stage supplies power to a first load, the first power delivery stage being associated with a voltage regulator integrated with a processor die, the determined information including a plurality of values usable as initial conditions for an adaptive loop associated with an adaptive tracking controller;

storing the determined information including the plurality of values in a dynamic look-up table of the adaptive tracking controller engine;

updating the plurality of values that are stored in the dynamic look up table as the first power delivery stage supplies power to the first load;

sensing an input to the first power delivery stage and an output from the first power delivery stage using a first controller that exchanges information with the adaptive tracking controller engine;

determining information about a second power delivery stage associated with a second controller as the second power delivery stage supplies power to a second load; and using the adaptive tracking controller alternately between the first power delivery stage and the second power delivery stage.

2. The method of claim 1, further comprising:
accessing information from the dynamic look-up table to dynamically program the first power delivery stage.

3. The method of claim 2, wherein the determined information is associated with a control parameter over a plurality of operating condition values, and the dynamic look-up table stores information about the first power delivery stage for the plurality of operating condition values.

4. The method of claim 3, wherein said programming is associated with an adaptive control scheme using at least one control parameter.

5. The method of claim 4, wherein the control parameter is associated with at least one of: (i) a switching frequency, (ii) a current sharing ratio, (iii) a dead-time period, (iv) a drive voltage, or (v) a number of switches.

6. The method of claim 5, wherein said programming is associated with a plurality of control parameters and the dynamic look-up table has a multi-dimensional architecture.

7. The method of claim 1, wherein a tracking loop associated with the adaptive tracking controller engine is periodically adjusted to (i) reduce power loss or (ii) improve dynamic performance.

8. The method of claim 1, wherein each operating condition value is associated with at least one of: (i) a load consumption value, (ii) an input voltage value, (iii) a temperature value, (iv) a battery charge status, or (v) a duty cycle value.

9. The method of claim 1, wherein said storing is performed in connection with a number of different types of operating conditions.

10. The method of claim 1, wherein the second power converter is associated with a dynamic look-up table.

11. The method of claim 1, wherein the power delivery stage is associated with a voltage regulator for an electronics device.

12. An apparatus, comprising:
an adaptive tracking controller engine associated with a first power delivery system, the first power delivery system being associated with a voltage regulator integrated with a processor die;
an input to the adaptive tracking controller engine to receive information associated with a control parameter over a plurality of operating condition values as the first power delivery system supplies power to a first load; and
a dynamic look-up table to store information about the first power delivery system for the plurality of operating condition values, the stored information including a plurality of values usable as initial conditions for an adaptive loop associated with the adaptive tracking controller;
wherein the adaptive tracking controller engine is further to (i) update the plurality of values stored in the dynamic look-up table as the first power delivery system supplies power to the first load and (ii) exchange information with a first controller that senses an input to the first power delivery system and an output from the first power delivery system; and
wherein the adaptive tracking controller is used alternately between the first power delivery system and a second power delivery system that supplies power to a second load and is associated with a second controller.

13. The apparatus of claim 12, wherein the adaptive tracking controller engine is alternately associated with each one of three power delivery systems, wherein the three power delivery systems includes the first power delivery system and the second power delivery system.

14. The apparatus of claim 12, wherein the dynamic look-up table is adaptive and has a multi-dimensional architecture.

15. The method of claim 1, wherein the determined information stored in the dynamic look-up table includes a variable stored in the dynamic look-up table, the method further comprising:
periodically updating the variable stored in the dynamic look-up table as the power delivery stage supplies power to the load.

16. The method of claim 15, wherein the variable stored in the dynamic look-up table has a value and wherein periodically updating comprises:
determining a new value for the variable; and
storing the new value for the variable.

17. The method of claim 15, wherein the variable stored in the dynamic look-up table has a value and wherein periodically updating comprises:
using the value as an initial condition for an adaptive loop that determines a new value for the variable; and
storing the new value for the variable.

18. The method of claim 1, wherein the determined information stored in the dynamic look-up table includes a first variable stored in the dynamic look-up table and a second variable stored in the dynamic look-up table, the method further comprising:
updating the first variable stored in the dynamic look-up table;
waiting after updating the first variable; and
after the waiting, updating the second variable stored in the dynamic look-up table.

19. The apparatus of claim 12, wherein the stored information about the power delivery system includes a value of a variable, wherein the adaptive tracking controller is an adaptive tracking controller to determine a new value of the variable and wherein the dynamic look-up table comprises a dynamic look-up table to store the new value of the variable.

* * * * *